United States Patent [19]

Weetall

[11] Patent Number: 4,490,399
[45] Date of Patent: Dec. 25, 1984

[54] PROCESS AND COMPOSITIONS FOR REMOVING TANNINS FROM WINE

[75] Inventor: Howard H. Weetall, Big Flats, N.Y.

[73] Assignee: Corning Glass Works, Corning, N.Y.

[21] Appl. No.: 485,478

[22] Filed: Apr. 15, 1983

[51] Int. Cl.$^3$ ............ C12G 2/00; C12G 3/08
[52] U.S. Cl. ................ 426/330.4; 426/490; 426/592
[58] Field of Search ........... 426/41, 46, 34, 330.4, 426/330, 253, 256, 490, 592

[56] References Cited

U.S. PATENT DOCUMENTS

| 2,471,474 | 5/1949 | Alba | 426/330.4 |
| 2,860,987 | 11/1958 | Werner | 426/330.4 |
| 3,958,023 | 5/1976 | Butterworth | 426/330.4 |
| 4,027,046 | 5/1977 | Bohm et al. | 426/330.4 |
| 4,166,141 | 8/1979 | Westermann | 426/330.4 |
| 4,288,462 | 9/1981 | Hou et al. | 426/330.4 |

*Primary Examiner*—Jeanette Hunter
*Attorney, Agent, or Firm*—B. D. Voyce

[57] ABSTRACT

A process for removing tannins from wine is characterized by:
(a) immobilizing gelatin to form a composite;
(b) contacting a wine containing tannins with the immobilized gelatin composite; and
(c) separating the wine from the composite.

4 Claims, No Drawings

PROCESS AND COMPOSITIONS FOR REMOVING TANNINS FROM WINE

TECHNICAL FIELD

The present invention relates to a novel process for removing tannins from wine, and the compositions that makes it possible. More particularly, it discloses immobilized gelatin composites which quickly remove tannins from wine, and thereby improve the organoleptic character of young wines.

RELATED APPLICATION

Concurrently filed with the present application is a related disclosure by the same inventor, PROCESS FOR REMOVING NATURAL COLORANTS FROM WINE, Ser. No. 485,477 filed Apr. 15, 1983. The specification of the related application is to be incorporated into the present specification by this reference.

BACKGROUND ART

Winemakers have recognized for a long time that wines young in age have a sour flavor which renders them unpalatable. The sourness in young wines comes from high levels of tannin. Typically, one must wait from several months to years for tannins to oxidize naturally before a wine emerges with a desirable organoleptic character.

Present in the juice and skins of wine grapes, tannins are solvated into the wine must, and becomes part of the young wine. Chemically, the natural tannin found in wine grapes is formed by the polymerization of elementary phenolic molecules. These water soluble compounds have a molecular weight between 500 and 3000 and are known as condensed tannins. Typically, they are condensed polymers from 3-flavanols (catechins) and 3-4 flavandiols (leucoanthocyanidin).

However, another group of tannin compounds can also be found in wines. By law, one may add tannins to wine, e.g., tannic acid. Also, when one stores wine in oak casks, tannins leach out of the wood and into the wine. These tannins are referred to as hydrolyzable tannins, differing from the condensed tannins in that they are composed of one glucosidic molecule bonded to a phenolic moiety, e.g., gallic acid or ellagic acid.

Whatever the source, the problem remains the same—high tannin equals sourness. It would be most beneficial and expedient to remove or reduce the tannin content of young wines, instantly producing a palatable wine months ahead of schedule.

DISCLOSURE OF THE INVENTION

The present invention comprises a novel process and composite for removing tannins from wine. The composite is made by immobilizing gelatin, i.e., making it insoluble in wine. Thereafter, a wine containing tannins is contacted with the immobilized gelatin composite for a time sufficient to remove the desired amount of tannins. The wine separated from the insoluble composite has a reduced tannin content.

Gelatin, as defined by those skilled in the art, includes those albuminous proteins found in plant and animal tissue which are capable of forming a gel in water. Any compound fitting this description is suitable for the present invention.

BEST MODE OF CARRYING OUT THE INVENTION

In a preferred embodiment, the immobilized gelatin composite is formed by chemically derivitizing 20 grams of an alkylamine $SiO_2$ compound (Corning Biosystems) with glutaraldehyde (2.5% volume/volume) in 100 ml of a 0.05M, pH 7.0 phosphate buffer, for two hours. After being filtered and water washed, the derivitized $SiO_2$ compound is added to a second 100 ml of pH 7.0 phosphate buffer containing 4 grams of dissolved gelatin (K+K type 2991).

The gelatin and $SiO_2$ compound is reacted for over 8 hours at pH 7.0 and 37° C. The resulting immobilized gelatin composite is thoroughly water washed, acetone dried, and packed into a column. Tannin-containing wine at ambient temperature is passed through the column at a flow rate of 60 ml/hr to reduce the tannin content.

When the above embodiment was performed on young wine, strong in tannins, an expert wine panel was assembled for a taste test. The unanimous consensus was that while the untreated wine was sour and unpalatable, the column effluent wine was organoleptically better, i.e., smoother in taste. The strong tannin flavor was reduced significantly making the wine palatable.

Alternative embodiments include the use of equivalent insoluble ceramic carriers such as alumina, titiania, and zirconia. Attachment of gelatin would be performed by conventional crosslinking, covalent bonding, and adsorptive methods known to those of skill in the art.

A different set of embodiments envisions the immobilizing of gelatin by polymerizing it so as to form a insoluble polymer. Other conventional techniques are known to the art, e.g., cross-linking with glutaraldehyde, ethyl chloroformate, o-dianisidine, and other bifunctional or multifunctional agents.

Having described the invention with particular reference to preferred embodiments, it will be obvious to those skilled in the art to which the invention pertain, that, after understanding the invention, various changes and modifications may be made without departing from the spirit and scope of the invention as defined by the appended claims.

I claim:

1. A process for removing tannins from wine so as to improve the taste is characterized by:
   (a) immobilizing solubilized gelatin by attaching the gelatin to an insoluble carrier to form a composite;
   (b) contacting a wine containing sour-tasting tannins with the immobilized gelatin composite; and
   (c) separating the wine from the composite.

2. The process of claim 1 wherein the attachment comprises a covalent bonding of gelatin to insoluble siliceous material.

3. A process for removing tannins from wine so as to improve the taste is characterized by:
   (a) immobilizing solubilized gelatin by polymerization with a cross-linking agent;
   (b) contacting a wine containing sour tasting tannins with the immobilized gelatin composite; and
   (c) separating the wine from the composite.

4. The process of claim 3 wherein the gelatin is immobilized by cross-linking with glutaraldehyde.

* * * * *